United States Patent
Dulla et al.

(10) Patent No.: US 10,953,552 B1
(45) Date of Patent: Mar. 23, 2021

(54) END OF ARM TOOL AND SYSTEM FOR TOTE DE-PALLETIZING

(71) Applicant: Amazon Technologies, Inc., Seattle, WA (US)

(72) Inventors: Preet Dulla, Seattle, WA (US); Roland Menassa, Renton, WA (US); Todd McIntosh, Holland, MI (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,660

(22) Filed: Dec. 13, 2018

(51) Int. Cl.
| | |
|---|---|
| *B25J 15/00* | (2006.01) |
| *B25J 19/04* | (2006.01) |
| *B65G 47/90* | (2006.01) |
| *B65G 61/00* | (2006.01) |
| *B65H 67/06* | (2006.01) |

(52) U.S. Cl.
CPC ........... *B25J 15/0052* (2013.01); *B25J 19/04* (2013.01); *B65G 47/907* (2013.01); *B65G 61/00* (2013.01); *B65H 67/065* (2013.01)

(58) Field of Classification Search
CPC ........ B25J 15/12; B25J 15/0052; B65G 61/00
USPC .......................... 294/87, 99; 414/226.01, 802
See application file for complete search history.

(56) References Cited

U.S. PATENT DOCUMENTS

2012/0009053 A1* 1/2012 Boschi ................. B25J 15/0052
414/799

* cited by examiner

*Primary Examiner* — Ronald P Jarrett
(74) *Attorney, Agent, or Firm* — BakerHostetler (57) ABSTRACT

An end-of-arm tool and corresponding system and method for automated de-palletization of a stack of totes include resilient guide arms that extend outwardly in a cascading relationship, with the lower guide arm extending farther than higher arms. The cascading relationship of the guide arms enables totes in a stack to be engaged and aligned sequentially from lowest to highest.

17 Claims, 6 Drawing Sheets

END OF ARM TOOL AND SYSTEM FOR TOTE DE-PALLETIZING

BACKGROUND

This invention is related to container transport, and more particularly to machinery and methods for moving and de-stacking containers, such as totes.

A great number of containers are moved in modern commerce. For example, in a modern fulfillment center, items are placed into open-top containers referred to as totes for movement within a fulfillment center.

Often, totes or like containers are placed on a pallet for transport to another facility. The objects loaded in totes take many shapes and are loaded in many combinations, and sometimes the objects settle or move during shipment. Totes can be bowed at the sidewalls by over-large objects or can be partially crushed or broken if over-loaded. A stack of totes can lean even if properly stacked, depending on the location or orientation of the objects. And a tote in a stack can be misaligned in an x-y orientation and/or in a z orientation (that is vertically) such as when an upper tote is not located within the frame of the lower tote, but rather rests in the lip of the lower tote.

Any of the above issues can inhibit the application of automation to unloading totes on a pallet, requiring human intervention and problem solving.

DETAILED DESCRIPTION OF ILLUSTRATIVE EMBODIMENTS

An automated system and method for de-palletizing totes includes mechanically intelligent, self-aligning features. The system can automate engaging and lifting a stack of totes where the totes are in a condition other than intact and perfectly stacked—such as mis-aligned and/or damaged totes. In this regard, each tote in the stack can be seated in an opening of a lower tote, but tilted by items in the tote (for example, by the configuration of the items in the tote or by overfilling of the tote) such that the tote or the entire stack leans. A tote may be resting on a rim of the long side of the tote or the rim on a short side of the tote, and not seated in the lower tote. A tote may be skewed and/or tilted relative to other totes, such as if resting on both the side rim and end rim of the lower tote. A tote may be seated on its lower tote, but the rims of one stack may be resting or hung-up on the rim of an adjacent tote to misalign it. A partially crushed tote may make the entire stack lean. A tote may be overfilled such that the sidewalls bulge outwardly. A tote may have a broken sidewall. A pallet may be crushed or damaged.

In any circumstances or combination of circumstances of misalignment or damage listed above, or other misalignment or damage or for other reasons, the stack of totes may pose difficulties in reliably automating unloading or de-palletizing of the tote in a stack. The term "misalignment" is used broadly to refer to any type of x-y deviations and/or z deviations of the totes, deviations in the tote itself (such as a crushed tote, broken wall, or the like), deviation in the pallet, and like problems relating to de-palletizing, including by not limited to the problems explained in the preceding paragraph.

An end-of-arm tool (EOAT) is capable of aligning misaligned during de-palletizing. The EOAT tool includes a vertical frame having a mount for attaching to an automated arm, such as a robot, a gantry, or any mechatronic or mechanical structure or other structure capable of performing the functions described herein. Multiple pairs of tote-stack guide arms are vertically aligned on the frame. Each guide arm is resilient and outwardly flared. Each pair of guide arms has a horizontal length that is greater than a horizontal length of an adjacent, higher pair of guide arms. In a side view, the guide arms are vertically spaced apart to form a stepped configuration, which is referred to herein as a cascading configuration from longest to shortest from bottom to top. Other configurations in which tips or ends of the arms form the cascading configuration are contemplated. In this regard, the guide arms are configured to engage totes in a stack in sequence from lowest to highest and to align each tote in sequence relative to the EOAT upon engagement. Upon full engagement of the guide arms with the stack of totes, the EOAT is configured to move upward relative to the tote to lift the aligned stack of totes.

The EOAT can include multiple upward-facing hooks. Each one of the hooks is aligned with a corresponding pair of guide arms and configured to engage a tote in a recess formed by a peripheral lip of the tote to secure the tote to the EOAT.

Each of the tote-stack guide arms is resilient and capable of flexing upon contact with the totes as the EOAT engages a stack of totes, thereby aligning the totes to the EOAT. Outwardly flared arms and/or tips of the arms aid in engagement and alignment.

A vision system can acquire an image of a pallet and/or a lowermost tote to enable a control system to accurately move the EOAT into engagement with stack of totes. A sensor, which may be on or near the hook, may be used to confirm that the tote is in a fully loaded position. Any (preferably conventional) vision system and sensors may be employed.

Thus, in operation, the arm of the robot may move the EOAT horizontally into engagement with a stack of totes. A lowermost (first) pair of arms first engage the lowermost (first) tote, guided by vision system information provided to the control system. The arms contact the lowermost tote as needed and flex as needed to move the tote into alignment with the EOAT. In the embodiment of the figures, alignment is such that the tote's long axis is aligned with the EOAT.

The next higher (second) pair of arms engage the next higher (second) tote after the first pair of arms engage the lowermost tote. Engagement of the second pair of arms (or even subsequent pairs of arms, such as third fourth and fifth arms) with the corresponding tote may occur while the first tote is still undergoing alignment via the first pair of arms. As the EOAT is moved farther into engagement with the stack, higher-up pairs of arms sequentially engage with the next-up tote until all totes and engaged with the corresponding arms.

At some point in the engagement, such as after all the arms are fully engaged with all of the totes and the EOAT reaches a stopping point corresponding with a front face of the frame contacting or nearly contacting the totes, the EOAT can move vertically upwardly such that a top edge of the arms contact an underside of a lip of the totes, and hooks on the frame and engage the a recess on a proximal edge of the tote defined by the lip. A sensor of any type can confirm that the tote is fully engaged by the hook.

Preferably the stack or column of totes are in mutual contact without any structure in between the totes. In the embodiments in which the totes are in mutual contact, it is preferred that the totes be stackable. In the tote embodiment shown in the figures, the capability to stack the totes exists when a tote is oriented opposite or 180 degrees from its adjacent totes. And the totes (shown in the figures) when all aligned in the same direction nest within one another, as will be understood by persons familiar with conventional totes.

Figure 1:
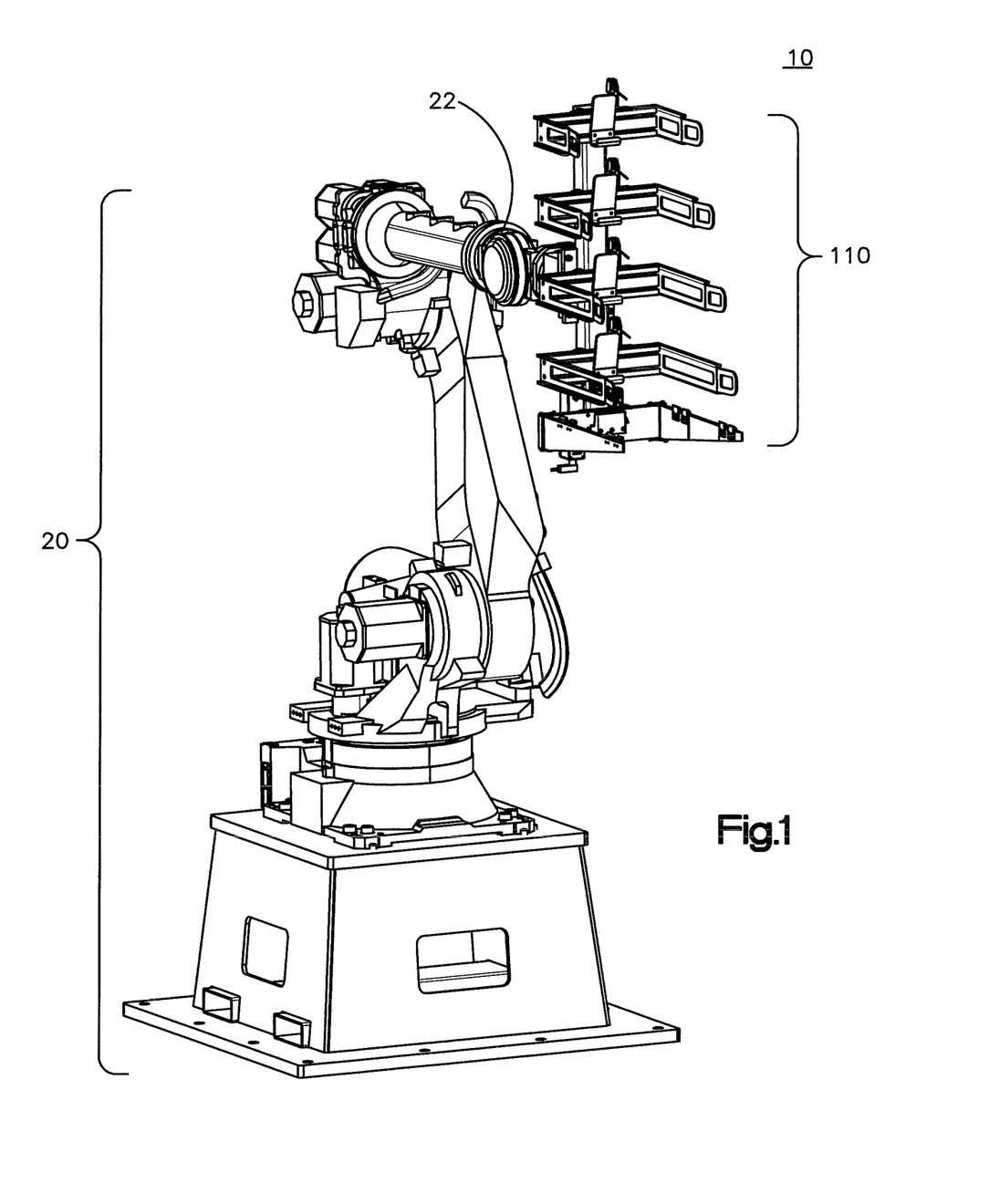
FIG. 1 is a perspective view of a tote de-palletizing system, including a robot and an end-of-arm tool (EOAT)
Figure 2:
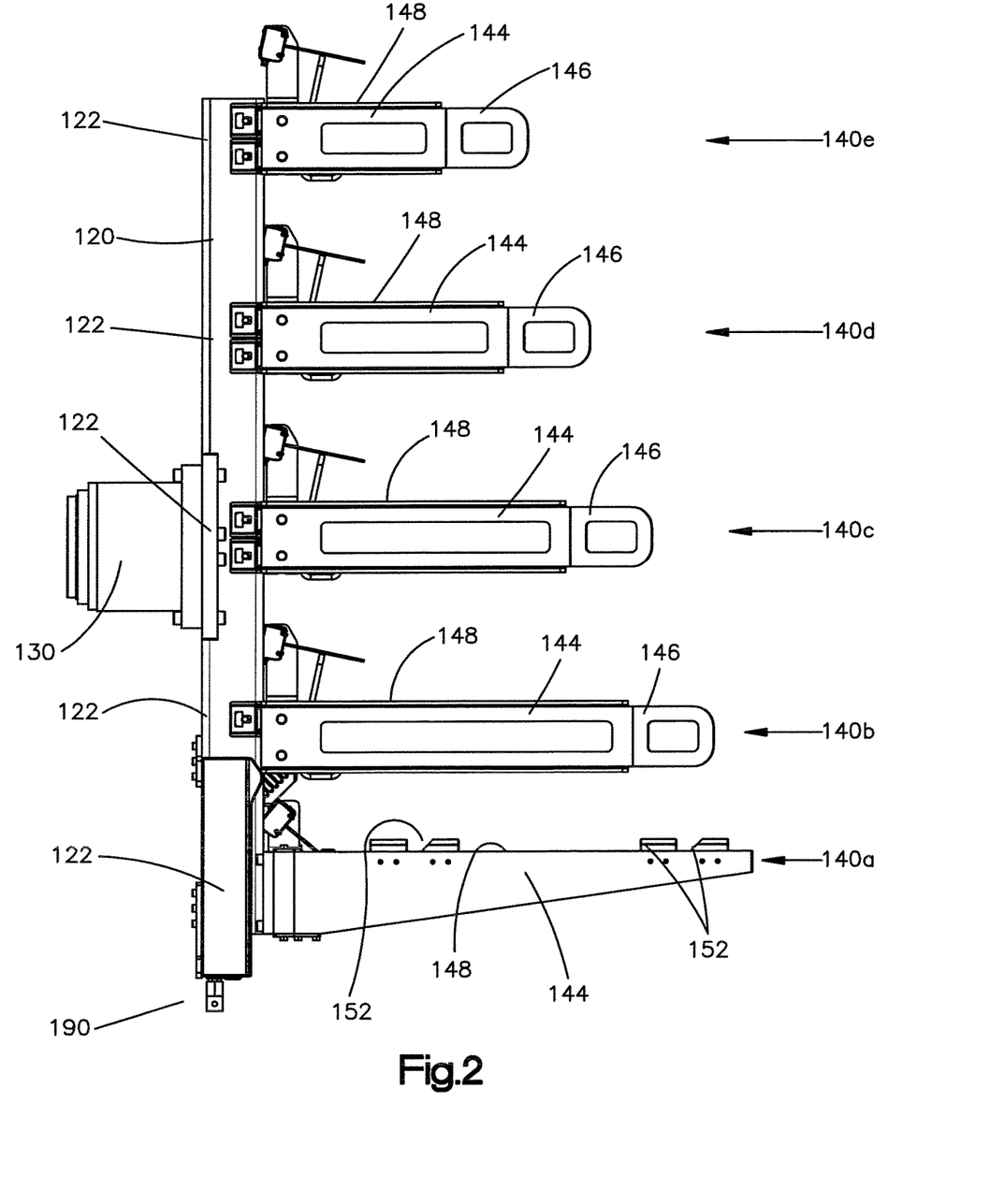
FIG. 2 is side view of the EOAT of FIG. 1.
Figure 3:
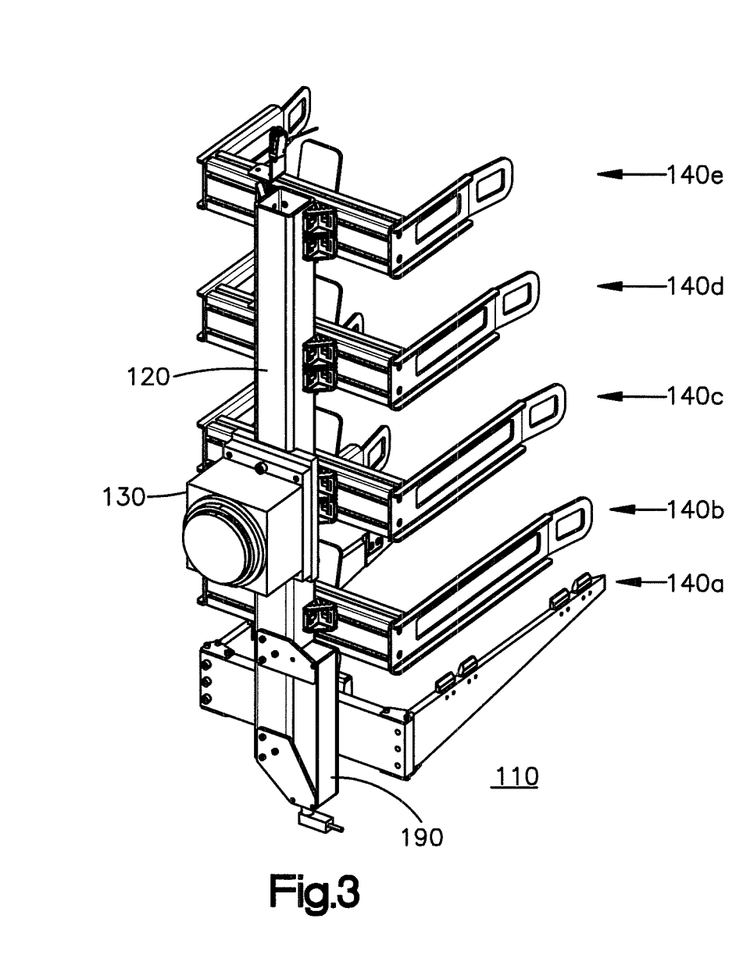
FIG. 3 a front perspective view of the EOAT of FIG. 1.

Referring to the figures, a tote de-palletizing system 10 includes an automated device, such as a six-axis robot 20 that is shown in FIG. 1. Robot 20 includes an arm 22 that is controlled by a control system to position and end-of-arm tool 110, which is attached to robot 20 at an interface 130. Interface 130 in the figures is a conventional robotic tool changer, such as a type supplied by ATI. Other configurations to affixed EOAT 110 to robot arm 22, as will be understood by persons familiar with robotic end effectors.

Figure 7:
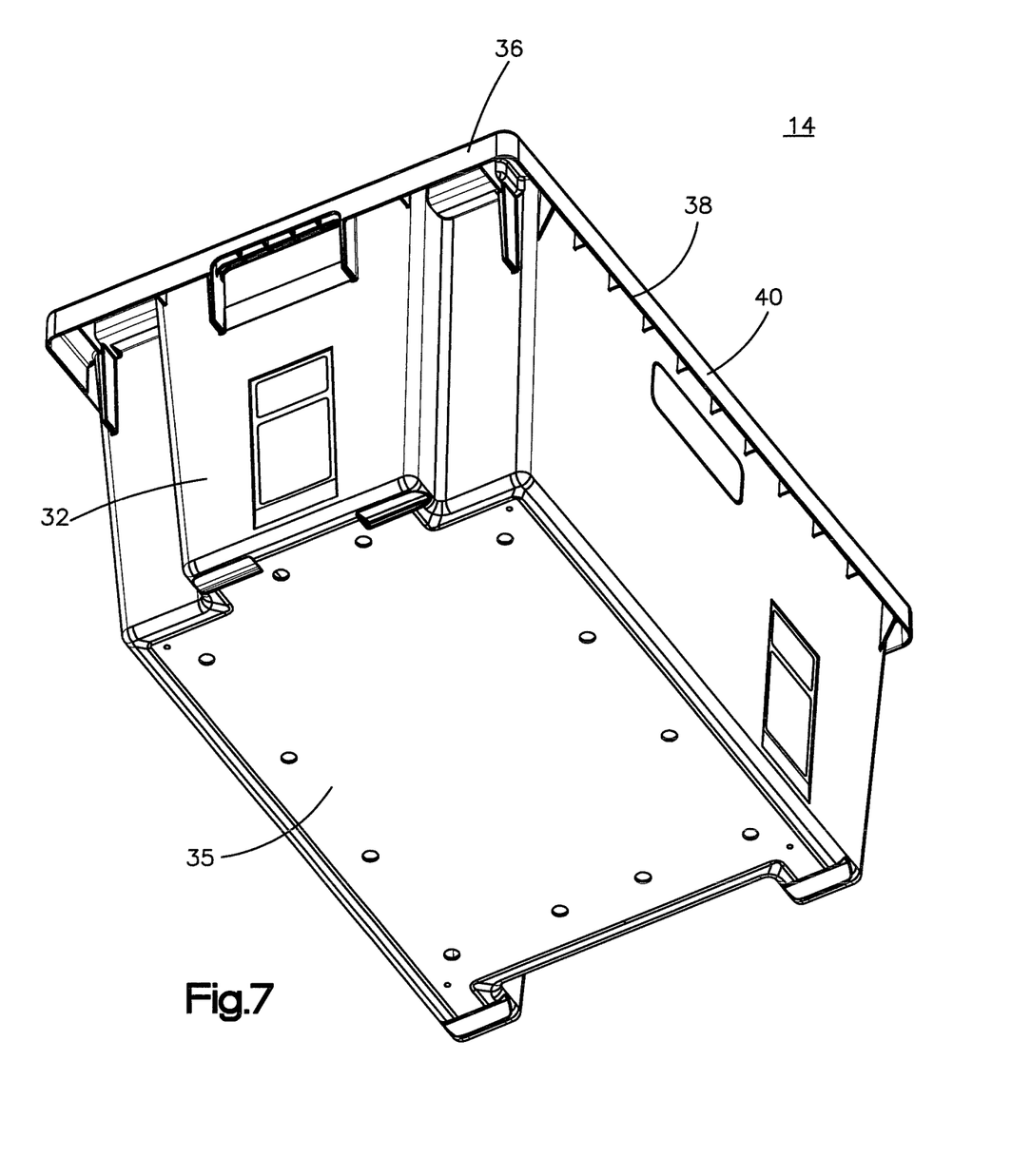
FIG. 7 is a perspective view of an underside of a tote that may be employed with the EOAT of FIG. 1.
Figure 8:
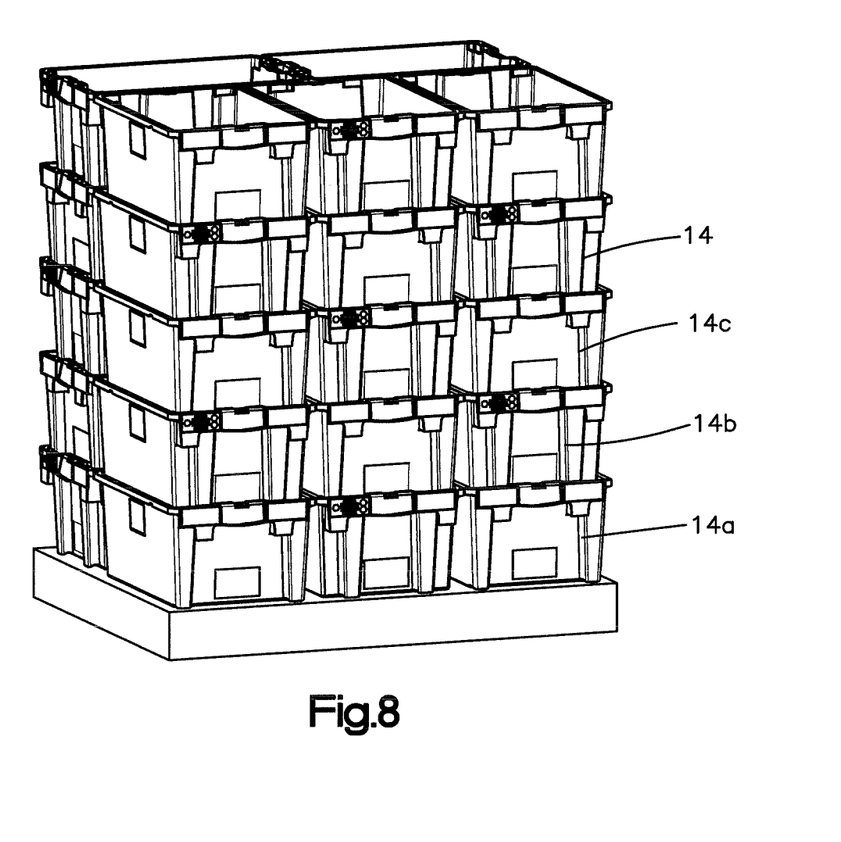
FIG. 8 is a schematic view of a stack of totes, illustrating the use of the tote de-palletizing system.

System 10 is configured to engage, align, and lift stacked totes, which are illustrated schematically in FIG. 8. Totes are illustrated by reference number 14 to refer to a tote generally, and the totes are given an appended letter to indicate a particular tote in a stack. A conventional tote 14 that can be used with EOAT 110 is illustrated in FIG. 7. Totes stacked on a pallet 42 are illustrated by totes 14*a*, 14*b*, 14*c*, 14*d*, and 14*e*. A stack of five totes are used to illustrate the structure and function of the EOAT 110, and the present invention is not limited to any particular number of totes. Rather, the quantity of stacked totes depends on constrains of a transportation system, such as the height available in a shipping container used to transport the totes.

Each tote includes a pair of opposing sidewalls, a rim extending outwardly from a top of each sidewall, and a skirt extending downwardly from each rim. An elongate recess is formed beneath each rim between the sidewall and the skirt. The term "pallet" as used herein broadly refers to any structure on which totes or containers can be loaded for subsequent transport as a unit. The term "tote" as used herein refers broadly to an open topped, reusable container. Each tote 14 preferably is an integral, high-impact plastic unit that includes a pair of tote sidewalls 30 and tote end walls 32 having a common enclosed bottom 35 to form an open-top container. A rim 34 wraps around the periphery of the upper edge of each sidewall 30 and end wall 34. A skirt 36 extends downwardly from the rim 34 such that a recess 38 is formed between an inboard surface of skirt 36, outboard surfaces of walls 30 and 32, and a lower surface of rim 34. Preferably, gussets 40 span recess 38 to reinforce the rim and skirt.

As best illustrated in FIGS. 1 through 5, EOAT 110 includes a vertical frame that includes a vertical spine 120 and five support beams 122 that extend vertically and laterally from spine 120. Other configurations are contemplated.

Five pairs airs of arms 140 extend from distal ends of each support beam 122. A lowermost pair of arms 140*a* extend from the distal ends of the lowermost support beam 122. A second pair of arms 140*b* are located vertically above lowermost or first pair of arms 140*a*. A third pair of arms 140*c* are located vertically above second pair of arms 140*b*. A fourth pair of arms 140*d* are located vertically above third pair of arms 140*c*. A fifth pair of arms 140*e* are located vertically above fourth pair of arms 140*d*.

Each pair of arms 140*a* through 140*e* are mutually parallel and approximately horizontal when put into use, as described more fully below. Further, each pair of arms is vertically aligned with other pairs of arms.

Each arm 140 includes a body 144 that extends from support beam 122 in a forward direction (that is, in the direction of engagement with totes 14). Body preferably is formed of a material that enables arm 140, including body 144, to resiliently flex when encountering misaligned totes, damaged totes, and/or bulging totes. In this regard, the term "align" refers to the function of arms 140 regarding any of misaligned, damaged, and bulging totes. The resiliency or flexing or arms 140 may be formed of by any means. For example, arms 140 may be formed of a steel that has inherent, elastic deformability, and formed in a shape and thickness to enhance the elastic deformability. The particular materials, shape, and thickness of body 144 may be chosen according to the particular parameters of the application, such as size and weight specifications for the loaded totes, length of arms, and the like.

Ends 146 are formed at distal ends (that is, spaced apart from beams 122). Ends 146 may be flared outwardly to enhance initial guiding of a tote 14 relative to EOAT 110. Arm body 144 may also be outwardly flared.

Each arm 140*a* through 140*e* includes an upper surface 148 that is configured to engage an underside of skirt 36, extends downwardly from the rim 34 such that a recess 38 is formed between an inboard surface of skirt 36, outboard surfaces of walls 30 and 32, and a lower surface of rim 34. Preferably, gussets 40 span recess 38 to reinforce the rim and skirt. The term "lip" is used herein to refer to the structure, and any portion thereof, of rim 34, skirt 36, and gussets 40.

A lowermost guide arm 140*a*, as illustrated in the figures, may be structurally more robust, and therefore more rigid, than upper guide arms 140*b* through 140*e*, as lowermost guide arm 140*a* can encounter a greater vertical load than arms 140*b* through 140*e*, and the lowermost tote is the one most likely to be crumpled or broken in a way that can put an unintended load on the arms. Accordingly, arms 140*b* through 140*e* are illustrated with cutouts to enhance flexibility, while arms 140*a* are illustrated without cutouts to enhance load-carrying capacity.

Lowermost guide arms 140*a* include upwardly projecting fingers 152 protruding form upper edges 148. Fingers 152 are sized and position to enter between gussets 40 or otherwise aid in retaining tote 14*a* on arms 140*a*. Optionally, the upper edges 148 of other arms 140*b* through 140*e* may include fingers 152.

Figure 6:
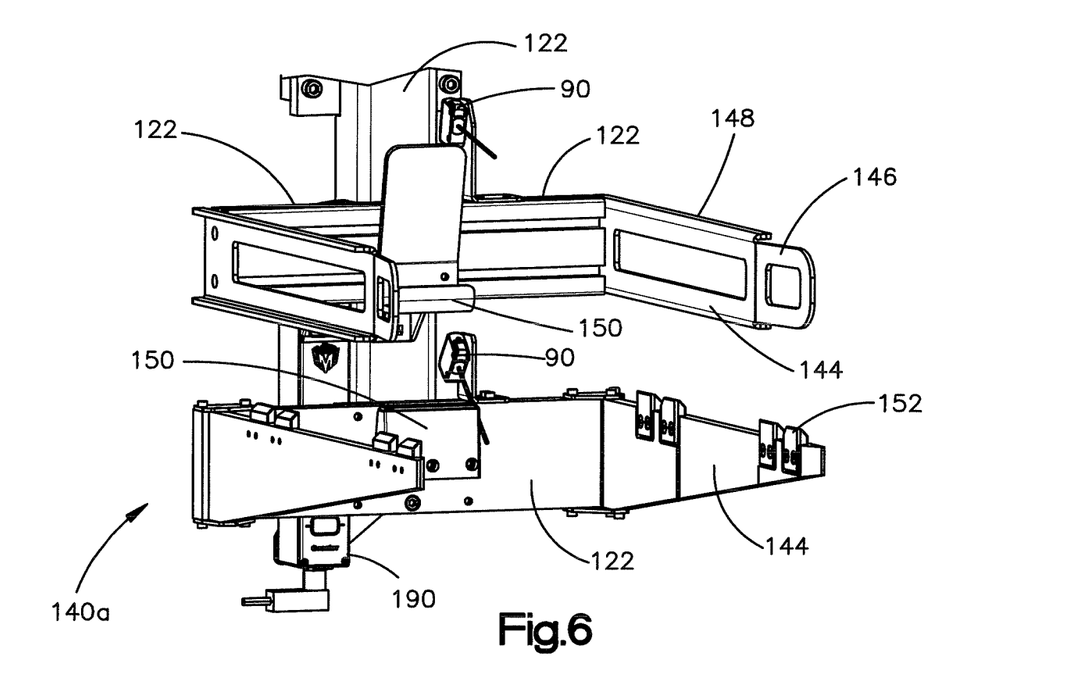
FIG. 6 is a front perspective of a lowermost portion of the EOAT of FIG. 1.

As best illustrated in FIG. 6, an upwardly facing hook 150 extends from the frame at spine 120 for each one of the pairs of arms 140*a* through 140*e*. A sensor 90 is associated with each hook 150. The sensors 90 can be proximity sensors, switches to confirm that each hook is engaged with a corresponding tote, optical sensors, or any other sensor that performs the function of confirming that a tote is fully loaded with respect to EOAT 110, as will be understood by persons familiar with instrumentation of end effectors.

Figure 4:
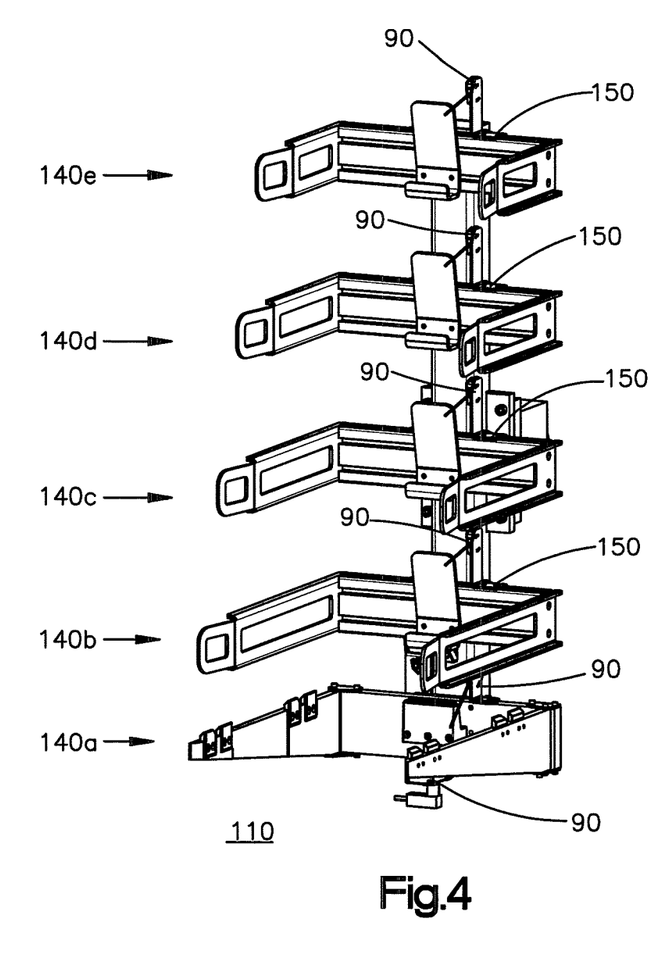
FIG. 4 is a rear perspective view of the EOAT of FIG. 2.
Figure 5:
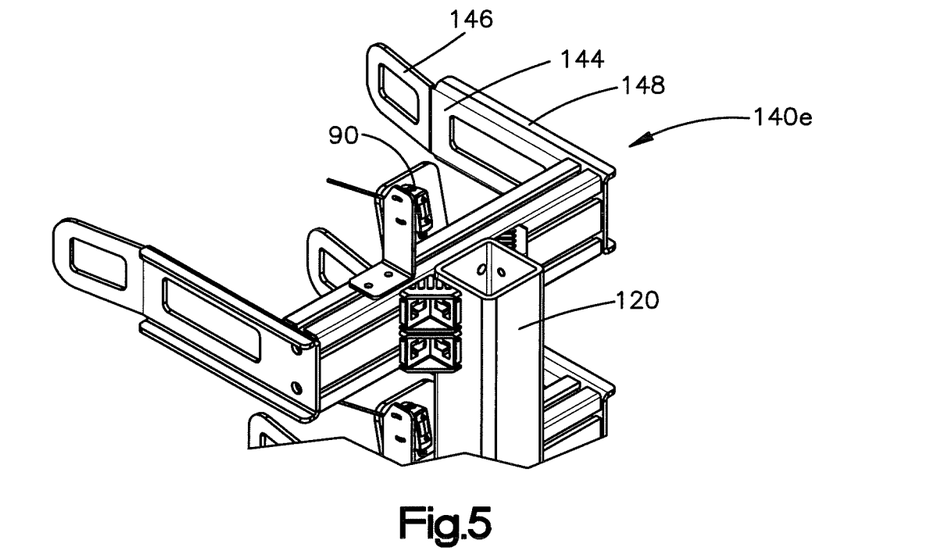
FIG. 5 is a rear perspective view of an uppermost portion of the EOAT of FIG. 1.

A vision system 190 may be located at a lower end of spine 120, as best illustrated in FIGS. 4-6. Vision system 190 can assess the position of EOAT 110 relative to a stack of totes 14 and in cooperation with a control system (not shown in the figures) guide EOAT 110 into engagement with the stack of totes. In the embodiment of the figures, vision system 190 is a laser profilometer, preferably of a conventional type. In the embodiment of the figures, vision system 190 acquires the image of lowermost tote 140a. Other functions are possible, such as acquiring an image of the pallet 142.

As used herein, the terms "vertical" and "horizontal" refer to general orientations, and perfect verticality, horizontality, and uniformity are not required, nor do the terms mean that the structure is required to be straight. Rather, the particular structural shape and verticality and/or horizontality can be determined to meet the particular design parameters of the application, as will be understood by persons familiar with robotic or automated systems and their function.

In operation, robot 20 can position EAOT 110 into position roughly aligned with a stack of totes 14. Vision system 190 acquires an image, such as an image of the lowermost tote 14a in a stack of totes on pallet 42. Arm 22 moves EAOT approximately horizontally, and also optionally with a vertical component as desired, such that tips 146 of lowermost guide arms 140a extend on opposing sides of tote 14a. Because of the cascading configuration, lowermost guide arms 140a engage the lowermost tote 14a before second guide arms 140b engage second tote 14b. Guide arms 140a contact the sidewalls 30 of tote 14a if tote 14a is not in its intended position, tote 14a is bulging from overloading, tote 14a is crumpled or misshapen from the load, or other reason. Lowermost guide arms 140a flex as needed.

As EAOT 110 continues to more forward, tips 146 of second guide arms 140b extend on opposing sides of second tote 14b. If tote 14b is misaligned flared tip 146 can move the tote 14b into position such that bodies 144 of arms 140b further move tote 14b into alignment with the tote 14a below it. Depending on the dimensions of the totes and the dimensions of the arms, as well as other parameters, the alignment of lower tote 14a may not be complete by the time upper arms 140b engage upper tote 14a such that arms 140a are still aligning tote 14a while arms 140b engage tote 14b. In this regard, the engagement of the arms with the totes is sequential. The alignment is referred to herein as sequential as the alignment, where needed, begins sequentially from lowest to highest and encompasses circumstances in which the alignment of a lower tote is not complete when alignment of a higher tote begins.

As EOAT moves farther forward, third arms 140c engage third tote 14c, aligning tote 140c as described above. Additionally, as EOAT continues to move forward, fourth arms 140d engage fourth tote 14d, and then fifth arms 140e engage fifth tote 14e, aligning the totes sequentially or simultaneously. In the intermodal containers of commercial carriers, the number of totes that can be stacked can be limited to either four or five in some circumstances.

At some point in the process of engagement of the totes by the arms, EOAT is moved vertically upwardly relative to the ground and relative to the totes. Upper surface 148 of each arm engage the lip on the side of the corresponding totes. Fingers 152 of first arm 140a enter a space between gussets 40, or optionally a pocket formed for the purpose of receiving fingers 152, to retain tote 14a on arms 140a in a horizontal direction.

In some embodiments, the arms engage the lips on the long sides of the totes in sequence from lowest to highest. In this regard, the vertical spacing of the arms is such that arms 140a engage the lips of tote 14a first, then second arms 140b engage the lips of tote 14b, then third arms 140c engage the lips of tote 14c, then fourth arms 140d engage the lips of tote 14d, and then fifth arms 140e engage the lips of uppermost tote 14e. Hooks 150 engage a portion of the corresponding end lips of the totes, at end wall 32, at approximately the same time that the upper edges 148 of arms 140 engage the corresponding lips on the sides 30 of the totes. Sensors 90 proximate the hooks 150 confirm to the control system that the totes are fully loaded (that is, retained by the hooks) position such that the control system can enable arm 22 to move EOAT and its loaded totes to a tote unloader, which can be conventional.

Some, any, or all of the methods and operations may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

The various examples further can be implemented using one or more user computers, computing devices or processing devices. Such a system can include a number of workstations running any of a variety of commercially-available operating systems and other known applications for purposes such as development and database management. These devices also can include other electronic devices, such as dummy terminals, thin-clients, and other devices capable of communicating via a network.

Operating environments can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The robotic arm technology disclosed herein may be employed with machine learning algorithms or artificial intelligence that enhances the control of the fingers and associated structure and function. In this regard, a control system may interpolate from existing information about and experiences with successful and unsuccessful prior sequences of seeing, engaging, and lifting an object according to established principles for computer learning. Further, the inventors contemplate a control system may extrapolate from the information and experiences to establish new sequences and functions for the robotic arm.

In view of the above controls description, the present invention is not intended to be limited to any particular type of hardware or software or any particular control means, but rather is intended to be able to be employed using any suitable controller.

The present invention has been described by employing examples of structure and function. The present invention is not limited to the structure or function described herein, but rather encompasses the structure(s) and function(s) defined in the claims and understood by persons familiar with container handling to flow naturally from the present disclosure. For example, the structure of the arms can take any form, intermediate arms or other structures can be positioned between the guide arms disclosed to aid in the alignment of the totes. Further, advantages of the structure have been described for context of the invention only. It is not intended that the present invention be limited to any advantage unless expressly stated in the claims.

What is claimed is:

1. An end-of-arm tool (EOAT) capable of de-palletizing a vertical stack of misaligned totes, the EOAT comprising:
   a vertical frame including a mount for attaching to an automated arm; and
   multiple pairs of tote-stack guide arms that are vertically aligned and that extend from the frame, each guide arm being resilient and outwardly flared;
   the guide arms being configured to engage totes in a vertical stack in sequence from lowest to highest and to align each tote in sequence relative to the EOAT upon engagement, and
   wherein each pair of guide arms has a horizontal length that is greater than a horizontal length of an adjacent, higher pair of tote-stack guide arms, such that the guide arms form a cascading configuration from longest to shortest from bottom to top;
   whereby upon full engagement of the guide arms with the stack of totes, the EOAT is configured to move upward relative to the tote to lift the aligned stack of totes.

2. The EOAT of claim 1 wherein the EOAT includes multiple upward-facing hooks, and wherein each one of the hooks is aligned with a corresponding pair of guide arms and configured to engage a tote in a recess formed by a peripheral lip of the tote.

3. An automated system capable of de-palletizing a stack of totes and aligning the totes during de-palletizing, the system comprising:
   an automated arm; and
   end-of-arm tool (EOAT) connected to the arm and including:
   a structural frame; and
   multiple pairs of tote-stack guides, each pair of tote-stack guides extending from the frame in a forward direction and being vertically aligned with other pairs of the tote-stack guides; each pair of tote-stack guides having distal tips that protrude beyond distal tips of an adjacent, higher tote-stack pair of guides; each pair of tote-stack guides being vertically spaced apart from other pairs of tote-stack guides to form a stepped configuration from longest to shortest from bottom to top;
   whereby the tote-stack guides are configured such that the tote-stack guides engage totes in a stack in sequence from lowest to highest and align the totes in sequence during engagement of the EOAT with a stack of totes.

4. The system of claim 3 wherein the structural frame is approximately vertical.

5. The system of claim 4 wherein the tote-stack guides are arms that extend from lateral sides of the frame.

6. The system of claim 4 wherein each one of the tote-stack guides is resilient such that the tote-stack guides are capable of flexing upon contact with the totes as the EOAT engages a stack of totes, thereby aligning the totes to the EOAT.

7. The system of claim 6 wherein each one of the tote-stack guides has an outwardly flared distal tip.

8. The system of claim 7 further comprising multiple hooks, each hook associated with a corresponding one of pairs of tote-stack guides, whereby upon full horizontal engagement of the EOAT, the hook is configured to move upwardly into a recess formed in an underside of a lip of the tote.

9. The system of claim 3 further comprising a vision system adapted to focus on a pallet and/or a lowermost tote and adapted for enabling the arm to move the EOAT into engagement with stack of totes.

10. The system of claim 3 further comprising a sensor on the system adapted for confirming a fully loaded position of the tote on the EOAT.

11. A method of de-palletizing a stack of totes by engaging and aligning the toes in sequence from lowest to highest, comprising the steps of:
   (a) positioning an end-of-arm tool (EOAT) relative to a stack of totes by automated movement of an arm affixed to the EOAT;
   (b) engaging a lowermost tote of the stack of totes with a lowermost pair of tote-stack guide arms by at least partially horizontal movement of the EOAT relative to the tote stack, and at least partially aligning the lowermost tote relative to the EOAT;

(c) engaging a second-to-lowermost tote of the stack of totes with a second pair of tote-stack guide arms after the engaging step (b), and at least partially aligning the second-to-lowermost tote relative to the EOAT; and (d) engaging a third-to-lowermost tote of the stack of totes with a third pair of tote-stack guide arms after the engaging step (c), and at least partially aligning the third-to-lowermost tote relative to the EOAT;

(e) engaging a fourth-to-lowermost of the stack of toes with a fourth pair of tote-stack guide arms after the engaging step (d), and at least partially aligning the fourth-to-lowermost tote relative to the EOAT;

(f) lifting the stack of totes.

12. The method of claim 11 wherein each one of the engaging steps include enabling the tote-stack guide arms to flex in response to engagement with the tote to aid the alignment of the tote.

13. The method of claim 12 further comprising the step of moving the EOAT vertically relative to the stack of totes such that the tote-stack arms sequentially from lowest to highest engage a lip of the totes.

14. The method of claim 13 wherein the step of moving the EOAT includes engaging a proximal recess of each one of the totes with a corresponding hook on a frame of the EOAT.

15. The method of claim 13 further comprising the step of confirming that each tote is in a fully loaded position on the EOAT via a sensor.

16. The method of claim 12 wherein the positioning step (a) includes aligning the EOAT with the stack of totes by employing a vision system on a frame of the EOAT.

17. The method of claim 16 wherein the positioning step (a) includes the vision system sensing only the lowermost tote.

\* \* \* \* \*